(12) United States Patent
Foerster et al.

(10) Patent No.: US 8,451,170 B2
(45) Date of Patent: May 28, 2013

(54) DEVICE AND METHOD FOR PRODUCING A DATA STREAM ON THE BASIS OF DATA PACKETS PROVIDED WITH PACKET SEQUENCE MARKS, AND SATELLITE RECEIVERS FOR PROVIDING THE DATA STREAM

(75) Inventors: Frank Foerster, Erlangen (DE); Thomas Pany, Neubiberg (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 138 days.

(21) Appl. No.: 12/933,154

(22) PCT Filed: Mar. 18, 2009

(86) PCT No.: PCT/EP2009/002011
§ 371 (c)(1),
(2), (4) Date: Nov. 16, 2010

(87) PCT Pub. No.: WO2009/115320
PCT Pub. Date: Sep. 24, 2009

(65) Prior Publication Data
US 2011/0050491 A1 Mar. 3, 2011

(30) Foreign Application Priority Data
Mar. 19, 2008 (DE) .......................... 10 2008 014 981

(51) Int. Cl.
*G01S 19/35* (2010.01)
(52) U.S. Cl.
USPC .................................................... 342/357.75
(58) Field of Classification Search
USPC .................................................... 342/357.75
See application file for complete search history.

(56) References Cited

U.S. PATENT DOCUMENTS

| 6,449,485 B1 * | 9/2002 | Anzil ......................... 455/456.1 |
| 2001/0009548 A1 | 7/2001 | Morris |

(Continued)

FOREIGN PATENT DOCUMENTS

| CA | 2 411 991 A1 | 5/2003 |
| EP | 0 186 343 A2 | 7/1986 |

(Continued)

OTHER PUBLICATIONS

Sanneck, "Packet Loss Recovery and Control for Voice Transmission over the Internet", Internet Citation, Oct. 10, 2000.
English language translation of Official Communication issued in corresponding International Application No. PCT/EP2009/002011, mailed on Dec. 23, 2010.

(Continued)

*Primary Examiner* — Harry Liu
(74) *Attorney, Agent, or Firm* — Keating & Bennett, LLP

(57) ABSTRACT

A device for determining a position of a satellite receiver on the basis of data packets that are received from the satellite receiver, include a satellite signal, and are provided with packet sequence marks includes a packet loss detector for detecting, while using the packet sequence marks, whether one or more data packets between two received data packets have been lost, and a data packet processor configured to replace the one or more lost packets by one or more fill-in packets so as to generate a data stream as a sequence of the received data packets and of the fill-in packets inserted in place of the lost data packets. The device further includes a correlator configured to correlate the data stream with a reference data sequence to obtain a correlation result, and a position determiner configured to determine the position of the satellite receiver by means of the correlation result.

47 Claims, 7 Drawing Sheets

U.S. PATENT DOCUMENTS

2001/0028634 A1* 10/2001 Huang et al. .................. 370/252
2005/0081245 A1   4/2005 Arad et al.
2007/0172061 A1*  7/2007 Pinder ........................... 380/240

FOREIGN PATENT DOCUMENTS

| EP | 0 545 636 A1 | 6/1993 |
| EP | 1 056 259 A1 | 11/2000 |
| WO | 2006/018803 A1 | 2/2006 |

OTHER PUBLICATIONS

Official Communication issued in International Patent Application No. PCT/EP2009/002011, mailed on Feb. 2, 2010.
Perkins et al., "A Survey of Packet Loss Recovery Techniques for Streaming Audio", IEEE Network, Sep./Oct. 1998, vol. 12, No. 5, pp. 40-48.
Sanneck, "Packet Loss Recovery and Control for Voice Transmission Over the Internet", Oct. 1, 2000.

* cited by examiner

DEVICE AND METHOD FOR PRODUCING A DATA STREAM ON THE BASIS OF DATA PACKETS PROVIDED WITH PACKET SEQUENCE MARKS, AND SATELLITE RECEIVERS FOR PROVIDING THE DATA STREAM

Embodiments in accordance with the present invention relate to a device for generating a data stream, to a method of generating a data stream, to a satellite receiver, or satellite receiver front end, for receiving a receive signal and for providing data packets, to a system for transmitting data packets, as well as to a computer program for executing the foregoing method.

BACKGROUND OF THE INVENTION

Devices and/or methods in accordance with some embodiments may be employed, for example, in satellite navigation receivers, or their associated front ends, which have an asynchronous interface that does not enable bidirectional transmission due to the limited transmission capacity.

Originally, satellite receivers were employed for position sensing and navigation in the military field, for example for weapon systems, warships and airplanes. Nowadays, however, satellite receivers are increasingly used for non-military purposes as well, for example for seafaring, aviation, by means of navigation systems in cars, for orientation in recreation, in metrology and surveying, in agriculture, in high-performance sports and for use in mobile phones.

For example, the levels of accuracy of satellite receivers nowadays even enable automatic touchdowns in civil aviation, provided that the center lines of the runway were precisely measured beforehand. Another widespread field of use is fleet management on the part of traffic enterprises as well as transport services on land and on water or at sea. For example, if the vehicles or ships are equipped with satellite receivers, the control room stays on top of the locations of the vehicles or ships at any time and can immediately intervene in the case of disturbances. Satellite receivers are also employed, for example, in cars so as to show the driver the way to the desired destination using comprehensive map and city map software, for example by providing the driver with acoustic directional instructions. Recently, the use of satellite receivers on PDA systems (personal digital assistance systems), PNA systems (personal navigation assistance systems) and in mobile phones has seen a sharp increase. Said devices may be flexibly and quickly employed in various vehicles, for example. Mostly, routing is graphically represented on a color screen and with interactive input.

The spreading of satellite receiving terminals may also be explained, in particular, with regard to the constant decrease in prices of electronic products. While fixedly installed systems are typically considerably more expensive than mobile terminals, they have the advantage, however, that they may be coupled to the vehicle's electronics. Thus, additional data which is available in the vehicle and also takes velocity and acceleration into account in order to determine the position more accurately and to be able to determine a position even in areas with no reception, e.g. tunnels, may be rendered usable.

Within buildings, satellite reception is mostly reduced or impossible. In the respective case, this will depend, e.g., on the building materials used in the building and/or their damping properties, and on the location within the building. For example, in the vicinity of a window or in rooms with large windows and an unobstructed sky view, position determination may still be quite possible with reduced accuracy, depending on the current satellite position. In internal spaces, for example cellars, satellite reception is highly restricted, however. Relatively recent satellite receivers enable ensuring reception of the satellite signal also in some situations such as inside buildings, for example. This may be enabled, for example, in that the receive signals are not measured chronologically, and in that not only one receive path is used, but in that a plurality of parallelized satellite receivers are used. By means of such parallel utilization of satellite receivers with simultaneous evaluation, e.g. multipath reception may be highly reduced, for example, so that in combination with an increased input sensitivity of the satellite signal, also those signals that have been reflected by walls and floors may possibly still be evaluated inside buildings or in narrow alleyways in densely built-up areas.

For example, satellite receiving systems measure the receiver's position by means of the distance from several satellites. For example, the satellites continuously emit their changing positions and the precise time of day. From their signal propagation times, the satellite receivers may then calculate their own positions and velocities. For this purpose, for example, three satellites may be used for determining the space coordinates, and a fourth satellite may be used for determining the time coordinate. By means of the satellite signals, not only the position, but also the velocity of the receiver may be determined, which may be effected, for example, by measuring the Doppler effect.

For example, satellites emit "spread spectrum" modulated signals. A data signal may be modulated, for example, with a pseudo-random code sequence and be received by the receiver by means of cross correlation. For particularly efficient transmission, code sequences, for example, may be used which exhibit a specific code phase shift. For example, the satellite signals are emitted, by means of the specific coding, such that the resulting transmission sequences of various satellites are orthogonal to one another, so that independent reception of the individual satellite signals becomes possible even though all of the satellites emit at the same frequencies. This code division multiple access (CDMA) is used in most satellite receiving terminals for evaluating the transmit signal(s), for example. For example, Gold sequences may be used for this which may be generated, for example, from two generator polynomials by means of fed-back shift registers, it being possible to use a code phase shift between the two generators in order to achieve that different Gold sequences having the identical generator polynomials are positioned within the code space such that they are almost orthogonal to one another and therefore hardly influence one another. In this respect, the received satellite signals have a sufficiently small cross correlation for the CDMA reception due to the code phase shifts, so that a plurality of satellites of the same transmit frequency may transmit data to the satellite receivers.

To increase accuracy, the signals may also be sent out by a satellite at several frequencies, for example; in most cases, one may select which code may be transmitted at which frequency. Due to the transmission at several frequencies, ionospheric effects, for example, which lead to an increase in the propagation time, may be subtracted out so as to increase the level of accuracy.

For example, a typical satellite receiver may operate in accordance with the principle that, for a received signal of a satellite, a Gold code sequence is generated which corresponds to the Gold code sequence emitted by the satellite. The code sequence received at, and the code sequence generated within the receiver itself initially are not temporally related. To establish this temporal relationship, both sequences are multiplied by each other after one of the sequences has undergone a temporal shift, and the multiplication results are added. This procedure may also be referred to as cross correlation. If the temporal shift is varied, the sum will change. For example, the sum will be at a maximum if the sequences temporally coincide.

For example, it is also possible—due to the specific code sequences emitted by the satellite—to ensure that the maximum of the cross correlation occurs only at the correct code sequence and at the correct temporal shift, which may also be referred to as uniqueness. By counting within the signal units, and by means of positional evaluation of the current time within the code block, it is possible, for example, to determine the precise transmission time when the received signal was emitted by the satellite. For the evaluation it is sufficient, for example, for only the time of the beginning of a code block within the satellite to be known. The receiver may then measure the time between the evaluation time and the beginning of a code block to determine the transmission time of the code block by evaluating the satellite message.

Because of the signal evaluation by means of cross correlation determination and evaluating the maximum of the cross correlation, it is particularly important that the temporal coherence of the receive signal is maintained. For example, a cross correlation can be correctly evaluated only if both signals over which the cross correlation is performed have a correct temporal relationship to each other. This means that a receive signal should have the same temporal reference as a transmitted signal so as then to be able to determine, by means of correlation, the temporal shift as compared to the transmitted signal.

The satellite navigation receiver mostly has only limited transmission capacity available to it for forwarding the signals received from the satellites to a checkpoint, for example, said limited transmission capacity enabling no bidirectional transmission, for example. Applications in this context comprise forwarding, with a low protocol overhead, the received data of a satellite navigation terminal to, e.g., a checkpoint which may enable, for example by means of the data of several satellite receive terminals, checking and monitoring the positions of the individual satellite navigation receivers. In this manner, for example, effective fleet management on the part of, e.g., traffic enterprises as well as efficient control of, e.g., transport services on land, in the air or at sea may be enabled. By means of the data sent by the satellite receivers, the control room stays on top of the locations of the various vehicles or ships or flying objects at any time and can immediately intervene in the case of disturbances.

For example, the satellite receiver which, in this communication, becomes the transmitter so as to transmit the data received from the satellites to the checkpoint, has an asynchronous interface available to it. The data stream is emitted by the transmitter, for example, as soon as the data is available to the transmitter and without the transmitter paying attention to the receiver. This means that due to the lacking reverse channel, no "handshake" can occur between the transmitter and the receiver. Since the transmitter receives no feedback from the receiver, any errors that occur on account of the transmission link cannot be balanced off by re-transmitting the defective packets. The data stream may consist, e.g., of a succession of packets that the transmitter may transmit to the receiver via its asynchronous interface with a low protocol overhead.

SUMMARY

According to an embodiment, a device for determining a position of a satellite receiver on the basis of data packets that are received from the satellite receiver, include a satellite signal, and are provided with packet sequence marks may have: a packet loss detector for detecting, while using the packet sequence marks, whether one or more data packets between two received data packets have been lost; and a data packet processor configured to replace the one or more lost packets by one or more fill-in packets so as to generate a data stream as a sequence of the received data packets and of the fill-in packets inserted in place of the lost data packets; a correlator configured to correlate the data stream with a reference data sequence so as to acquire a correlation result; and a position determiner configured to determine the position of the satellite receiver by means of the correlation result.

According to another embodiment, a method of determining a position of a satellite receiver on the basis of data packets that are received from the satellite receiver, include a satellite signal, and are provided with packet sequence marks may have the steps of: detecting, while using the packet sequence marks, whether one or more data packets between two received data packets have been lost; replacing the one or more lost packets by one or more fill-in packets so as to generate a data stream as a sequence of the received data packets and of the fill-in packets inserted in place of the lost data packets; correlating the data stream with a reference data sequence so as to acquire a correlation result; and determining the position of the satellite receiver by means of the correlation result.

According to another embodiment, a system for transmitting data packets that are based on a receive signal of a satellite receiver, include the receive signal, and are provided with packet sequence marks, and for determining a position of the satellite receiver may have: a satellite receiver for providing data packets that are based on a satellite signal, which satellite receiver may have: a sampler for sampling the satellite signal or an intermediate frequency signal derived therefrom so as to acquire a sequence of samples for the satellite signal; a data packet generator configured to generate a first data packet including a first subsequence of the samples, and to generate a second data packet including a second subsequence of the samples, the data packet generator being configured to provide the first data packet with a first packet sequence mark and to provide the second data packet with a second packet sequence mark, the packet sequence marks describing a temporal relationship between the first subsequence of samples and the second subsequence of samples; and a device for determining a position of a satellite receiver as claimed in claim 1; and a transmitter connected between the satellite receiver and the device for determining the position of the satellite receiver, such that the device for determining the position of the satellite receiver is fed the output signal of the satellite receiver.

According to another embodiment, a system for transmitting data packets that are based on a first receive signal and a second receive signal of a satellite receiver, include the first receive signal and the second receive signal, and are provided with packet sequence marks and channel marks may have: a satellite receiver for providing data packets that are based on a satellite signal which satellite receiver may have: a sampler for sampling the satellite signal or an intermediate frequency signal derived therefrom so as to acquire a sequence of samples for the satellite signal; a data packet generator configured to generate a first data packet including a first subsequence of the samples, and to generate a second data packet including a second subsequence of the samples, the data packet generator being configured to provide the first data packet with a first packet sequence mark and to provide the second data packet with a second packet sequence mark, the packet sequence marks describing a temporal relationship between the first subsequence of samples and the second subsequence of samples; a first device for determining a position of a satellite receiver, as claimed in claim 1; a second device for determining the position of the satellite receiver, as claimed in claim 1; a transmitter; and a channel associator, wherein the transmitter is connected between the satellite receiver and the channel associator, so that the channel associator is fed the output signal of the satellite receiver, and wherein the channel associator is configured to feed the received data packets to the first device or to the second device while using a channel mark.

Another embodiment may have a computer program including a program code for performing the method of determining a position of a satellite receiver on the basis of data packets that are received from the satellite receiver, include a satellite signal, and are provided with packet sequence marks, which method may have the steps of: detecting, while using the packet sequence marks, whether one or more data packets between two received data packets have been lost; replacing the one or more lost packets by one or more fill-in packets so as to generate a data stream as a sequence of the received data packets and of the fill-in packets inserted in place of the lost data packets; correlating the data stream with a reference data sequence so as to acquire a correlation result; and determining the position of the satellite receiver by means of the correlation result, when the computer program runs on a computer.

In addition, achieving said object comprises a system for transmitting data packets that are based on a receive signal of a satellite receiver and that are provided with packet sequence marks, as claimed in claim 40, and a system for transmitting data packets that are based on a first receive signal and a second receive signal of a satellite receiver and are provided with packet sequence marks and channel marks, as claimed in claim 50. In addition, achieving the object comprises a computer program as claimed in claim 52 which has a program code for performing the method as claimed in claim 23.

For maintaining the temporal coherence of the signal that is received from the satellite and is forwarded by the satellite receiver to the checkpoint as, e.g., a data stream consisting of individual packets, it is essential to preserve the temporal coherence while transmitting the packets, so that a receiver, for example at the checkpoint, may determine the precise positional data of the satellite receiver by means of cross correlation methods.

A core idea of an embodiment in accordance with the invention is to provide data packets, which transmit digital signals from a satellite receiver to a receive terminal via a non-fail-safe unidirectional transmission link, with packet sequence marks, by means of which association (which in some cases is actually unambiguous) of the measurement time of the individual signal values within a receiver is possible. By using the packet sequence marks, the receiver may detect whether one or more data packets between two data packets received have been lost, and may insert one or more fill-in packets into the data stream instead of the lost data packets, so that the temporal association of the individual data packets is maintained. Maintenance of the temporal association of the receive signal in some embodiments is essential to further processing, since, for example, by means of a subsequent cross correlation evaluation between the receive signal and a code sequence received at the receiver, the temporal relationship between the code sequence and the receive signal may be determined.

If this temporal relationship were disturbed, for example, by individual packets having been lost and not being able to be replaced, for example the downstream signal processing within the receiver would not be able to determine a maximum of the temporal shift between the code sequence and the signal received, or in the case of minor packet failures, it would determine the position of the cross correlation incorrectly, which might lead to considerable positioning errors. If lost packets are replaced, e.g., by fill-in packets, the temporal relationship is preserved, and the cross correlation evaluation can determine the maximum of the temporal shift very quickly. The fill-in packets may be configured, in some embodiments, such that they do not interfere with the correlation determination, that is, the fill-in packets may be selected, for example, such that they do not correspond to any valid code sequence or to any transmitted data packet of the satellite receiver. For example, zero packets (i.e., for example, data packets containing only "zeros") or purely randomly selected pseudo-random values are suitable as fill-in packets.

The packet sequence marks may be attached, for example within the satellite receiver (that is, e.g., prior to transmission via the unidirectional interface) to the provided data packets such that portions of the data packets (e.g. portions having samples of a satellite navigation receive signal) are overwritten with a packet sequence mark. In addition, it is also possible to attach the packet sequence marks in front of or behind the individual data packets, or to insert them into the data packets. Due to the correlation with a long data sequence that may be performed, for example, within a correlation receiver, losing individual data is not a major problem, since a correspondingly long time period is evaluated in the formation of a correlation. However, in some embodiments it is essential that the temporal position and the unambiguous association of the measurement time of the signal values are not changed.

When processing several frequency bands, it is sometimes desired to maintain the synchronicity of the individual frequency bands. This may be ensured, for example, in that the packet sequence marks of the individual frequency bands have the same mark when individual signal values of different frequency bands were measured at the same time. In this manner, synchronization over several frequency bands may be ensured, for example.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
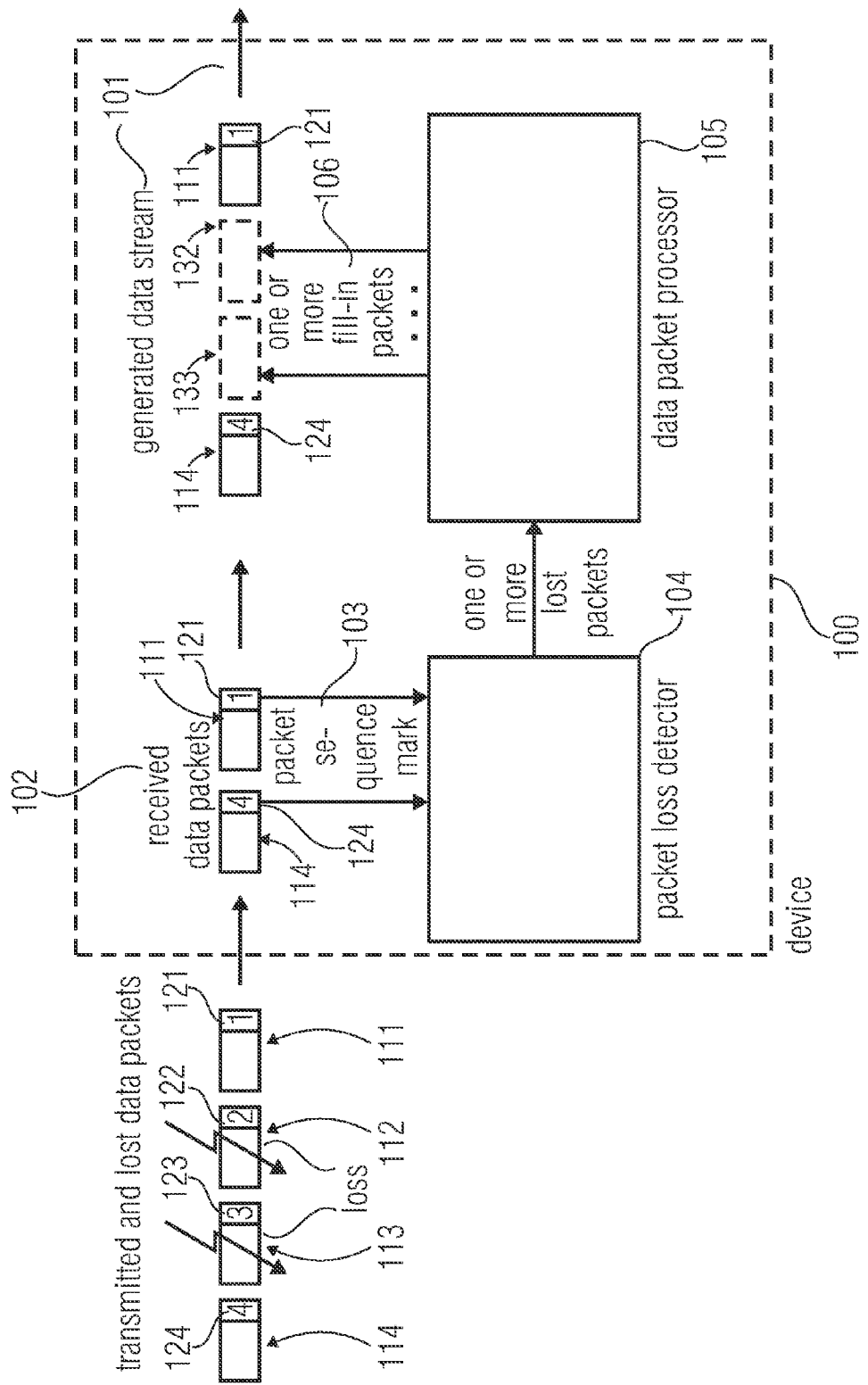
FIG. 1 shows a block diagram of a device for generating a data stream in accordance with an embodiment.

FIG. 1 shows a block diagram of a device 100 for generating a data stream in accordance with an embodiment, said data stream being based on received data packets provided with packet sequence marks. The device 100 may comprise a packet loss detector 104 and a data packet processor 105. The device 100 may generate a data stream 101 on the basis of received data packets 102 provided with packet sequence marks 103. In this embodiment, the device 100 receives, e.g., two data packets 111, 114 provided with packet sequence marks 121, 124, respectively. For example, a first received data packet 111 has a first packet sequence mark 121 (or, generally, any packet sequence mark), and a second received data packet 114 has a fourth packet sequence mark 124 (or, generally, any packet sequence mark). For example, a stream of transmitted data packets 111, 112, 113, 114 was generated by a satellite receiver and was sent to the device 100. In this embodiment, e.g. two packet losses occurred in the transmission path, the second data packet 112 comprising the second packet sequence mark 122, and the third data packet 133 comprising the third packet sequence mark 123 having been lost due to disturbances on the transmission path. In this embodiment, only the first data packet 111 comprising the first packet sequence mark 121, and the originally fourth data packet 114 comprising the fourth packet sequence mark 124, which is now received by the device 100 as the second data packet 114, arrive at the device 100.

The packet loss detector 104 of the device 100 may detect, by means of the packet sequence marks 121 and 124, that the first data packet 111 and the fourth data packet 114 have been received, and that the second data packet 112 and the third data packet 113 have been lost. The packet loss detector 104 may transfer this information to the data packet processor 105, which may fulfill the task of replacing the lost data packets 112, 113 by using fill-in packets 132, 133. Thus, it is possible, for example, to generate a data stream 101 which again has the original number of transmitted data packets, and for example a first data packet 111, a fill-in packet 132 replacing the second data packet 112, a fill-in packet 133 replacing the third data packet 113, and a fourth data packet 114. The lost data packets 112, 113 may be replaced, for example, by the fill-in packets 132, 133, so that the data stream 101 may be generated such that the received data packets 102 are arranged within the data stream 101 in accordance with their packet sequence mark 103, and that the one or more fill-in packets 132, 133 are arranged in accordance with a temporal position of the associated lost data packets 112, 113.

The one or more fill-in packets 132, 133 may have the same length, for example. The received data packets 102 may also have the same length in each case. The data packet processor 105 may further be configured to generate the one or more fill-in packets 132, 133 to have the length of the one or more data packets 111, 114. The fill-in packet 132 or 133 may be a zero packet, for example, i.e. it may comprise a sequence of zero values or a sequence of values that does not occur in any received data packet. The fill-in packets 132, 133 may also be random packets, for example, that comprise a sequence of randomly generated values or a sequence of pseudo-noise signals generated using a random number generator. However, in one embodiment, the fill-in packets 132, 133 should not comprise any sequence that occurs within a data word of a code sequence (e.g. of a code sequence used by a satellite navigation system), or that corresponds to a received data packet.

The packet sequence marks 103 may be attached, for example, at a predetermined location within the one or more data packets 111, 114, for example at a predetermined location that is identical for all of the received data packets 102. The packet sequence mark 103 may comprise a specific sequence of values, for example. For example, the packet sequence mark 103 may be a data word that follows the specific sequence of values within the one or more data packets 102.

The packet loss detector 104 may be configured, for example, to determine a number of lost data packets 112, 113 between two successively received data packets 111, 114, for example by evaluating a relationship between the packet sequence marks 121, 124 of the two received data packets 111, 114. For example, the packet sequence marks 103 may be configured as counters, or counts, it being possible to determine the number of lost data packets by means of the difference of the counter readings of the two counters (or of the counter values). In this embodiment, the second received packet sequence mark 124 has the counter reading, or count, "4", and the first packet sequence mark 121 has the counter reading "1", so that the difference between the two counter readings, which is reduced by one, a value of (for example two) lost packets may be determined.

If the packet sequence marks 103 are configured as counters, for example, e.g. the width of the counter, i.e. the number of bits available for representing the counter value, represents a measure of how many lost data packets 112, 113 may be detected by the packet loss detector 104 of the device 100. For example, the counter runs from zero to the maximum value that may be represented by the counter. Thereafter, the counter overflows and, for example, starts again to count up at zero. If, e.g., the number of data packets 112, 113 lost is higher than the number of values that can be represented by the counter before an overflow occurs, it will not be possible for the packet loss detector 104 to detect all of the lost data packets 112, 113. The maximum value of a detectable number of lost data packets 112, 113 corresponds, e.g., to the width of the counter or the number of values that can be represented by same. Detection of a larger number of lost data packets 112, 113 than the number of values representable by the counter, however, may be realized in that the device 100 has a clock for determining time information, for example on the basis of the received data packets 102, so that a counter overflow of one of the two counters may be detected from a relationship between the difference of the counter readings of the two counters and the time information of the two successively received data packets 111, 114. The number of lost packets 112, 113 may be determined, for example, while using the difference, reduced by one, of the counter readings of the two counters and the time information of the two successively received data packets. For example, this may be realized by means of a PC clock if the device 100 is realized on a PC and if the PC has internal or external time information available to it.

For example, the device 100 may replace a lost data packet 112, 113 by a fill-in packet 132, 133, respectively, by means of the data packet processor 105. However, it is also possible to replace several lost data packets 112, 113 by only one fill-in packet 106 of the same length as that of the lost packet 112, 113.

The device 100 may communicate, for example, the number of lost data packets 112, 113 to an operator, so that said operator may use the data for error evaluation or diagnosis. Also, deviation of the packet sequence mark 103 from a location at which the device 100 expects the packet sequence mark 103 may indicate an error, for example, that may be communicated to an operator so as to enable same to perform error evaluation or diagnosis.

On some transmission links it is also possible, for example, for received data packets 102 to not be received in the correct order. In a further embodiment, the device 100 may comprise a packet sorter which presorts, for example, the one or more data packets 102 in that order predefined by the packet sequence marks 103, and then feeds them to the packet loss detector 104. Thus, it may also be possible for the device 100, for example, to first put any received data packets 102 in the correct order before they are processed further by the packet loss detector 104.

Figure 2:
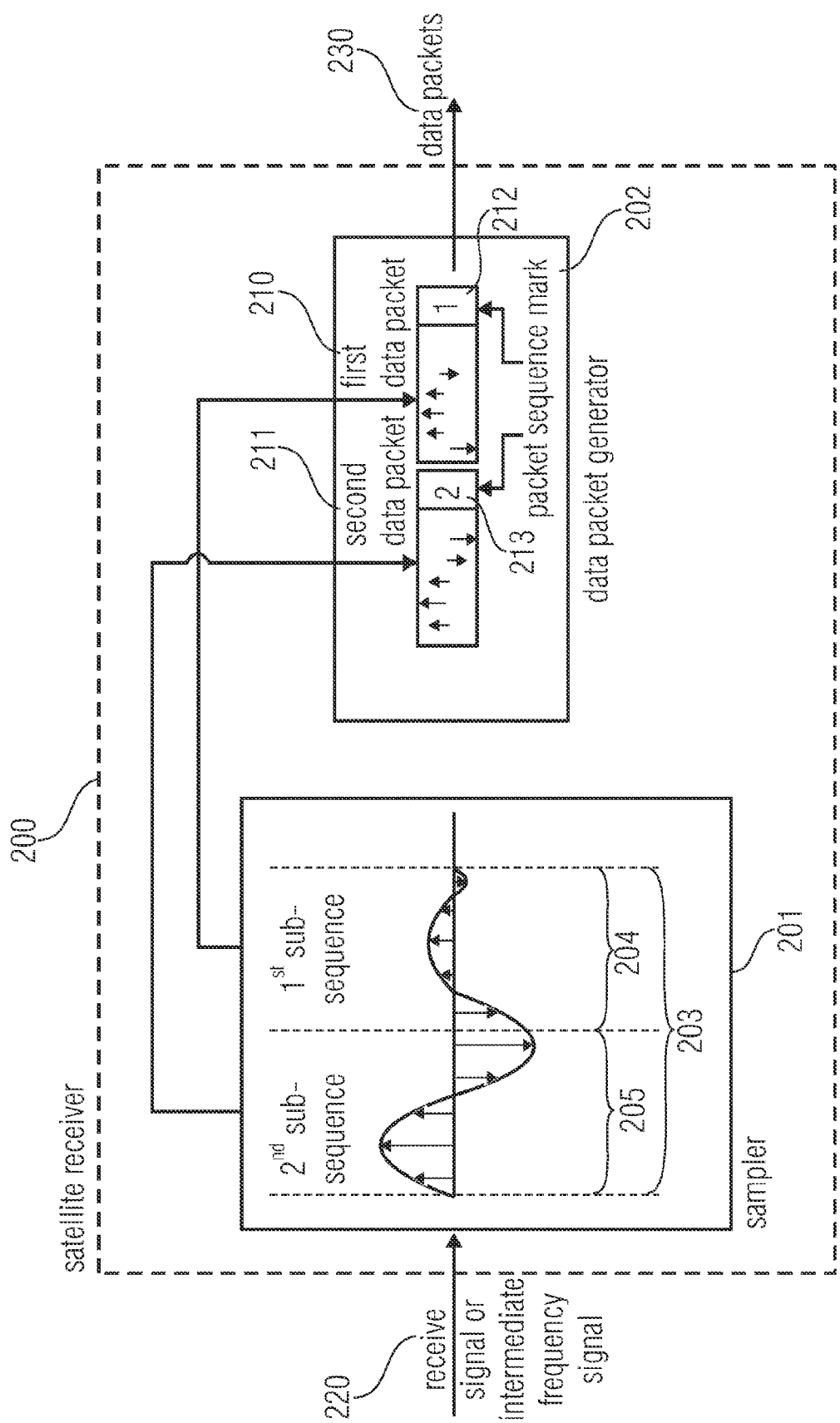
FIG. 2 shows a block diagram of a satellite receiver in accordance with an embodiment.

FIG. 2 shows a block diagram of a satellite receiver 200 in accordance with an embodiment. The satellite receiver 200 may comprise a sampler 201 and a data packet generator 202; the sampler 201 may sample a receive signal 220 or intermediate frequency signal so as to obtain a sequence of samples 203. The sequence of samples 203 may comprise, e.g., a first subsequence of the samples 204 and a second subsequence of the samples 205. The data packet generator 202 may be fed the two subsequences of samples 204, 205 in such a manner that the data packet generator 202 provides, e.g., the first subsequence 204 with a first packet sequence mark 212, and provides the second subsequence 205 with a second packet sequence mark 213, the packet sequence marks describing a temporal relationship between the subsequence 204 of samples 203 and the second subsequence 205 of samples 203. In this embodiment, this is indicated by the number "1" as the first packet sequence mark 212, and by the number "2" as the second packet sequence mark 213. Generally, the packet sequence marks may also be represented with any other values or sequences of values. The data packets 210, 211 generated by the data packet generator 202 may be provided, at the output, as provided data packets 230.

For example, the packet sequence marks 212, 213 may be used for overwriting the data packets 210, 211, or portions thereof. It is also possible to add the packet sequence marks 212, 213 in front of or behind the associated data packets 210, 211, or to insert them within the associated data packets 210, 211, so that, in contrast to overwriting, no data is lost. The data packets 210, 211 may be provided, e.g., with the associated packet sequence mark 212, 213 at the same location in each case. For example, a time stamp may be used as the packet sequence mark 212, 213, which time stamp provides the data packets with time information derived, e.g., from a sampling time of the sampler 201, at which sampling time a specific element of the subsequences 204, 205 associated with the data packets 210, 211 was sampled.

For packet sequence marking 212, 213, a counter may also be used, for example, which provides the data packets 210, 211 with a counter reading, it being possible for data packets 210, 211, which have different subsequences 204, 205 of the samples 203, to be provided with different counter readings. The counter may be counted up or down by a constant number, for example, when the second subsequence 205 of the samples 203 was sampled by the sampler 201 immediately after the first subsequence 204 of the samples 203. The data packet generator 202 may generate, e.g., the data packets 210, 211 with identical lengths. The packet sequence mark 212, 213 may overwrite, e.g., the data packets 210, 211 with a synchronization word 301 and a subsequent counter 303, the synchronization word 301 and the subsequent counter 303 overwriting the data packets 210, 211 at the same location each time, for example. In this manner, e.g., one or more samples may be overwritten. In one embodiment, the synchronization word 301 may comprise a 32-bit wide data word that comprises an alternating sequence 302 of data bits. The counter, or count, 303 may follow the synchronization word (also referred to as a preamble) 301 and may be realized, e.g., as a 16-bit wide data word 304, 305.

The receive signal 220 may be a receive signal of a satellite navigation system, for example the superposition of different CDMA signals of different satellites, or the receive signal may be an intermediate frequency signal, for example a receive signal 220 modulated to a lower frequency range. Sampling of an intermediate frequency signal is therefore recommendable, e.g., in the event that the receive signal 220 is of such a high frequency that it cannot be represented by the sampler 201, or, e.g., if there is a transmission link, between the reception of the receive signal 220 and the input of the sampler 201, which would highly dampen the original receive signal 220, but would dampen the intermediate frequency signal less highly.

Figure 3:
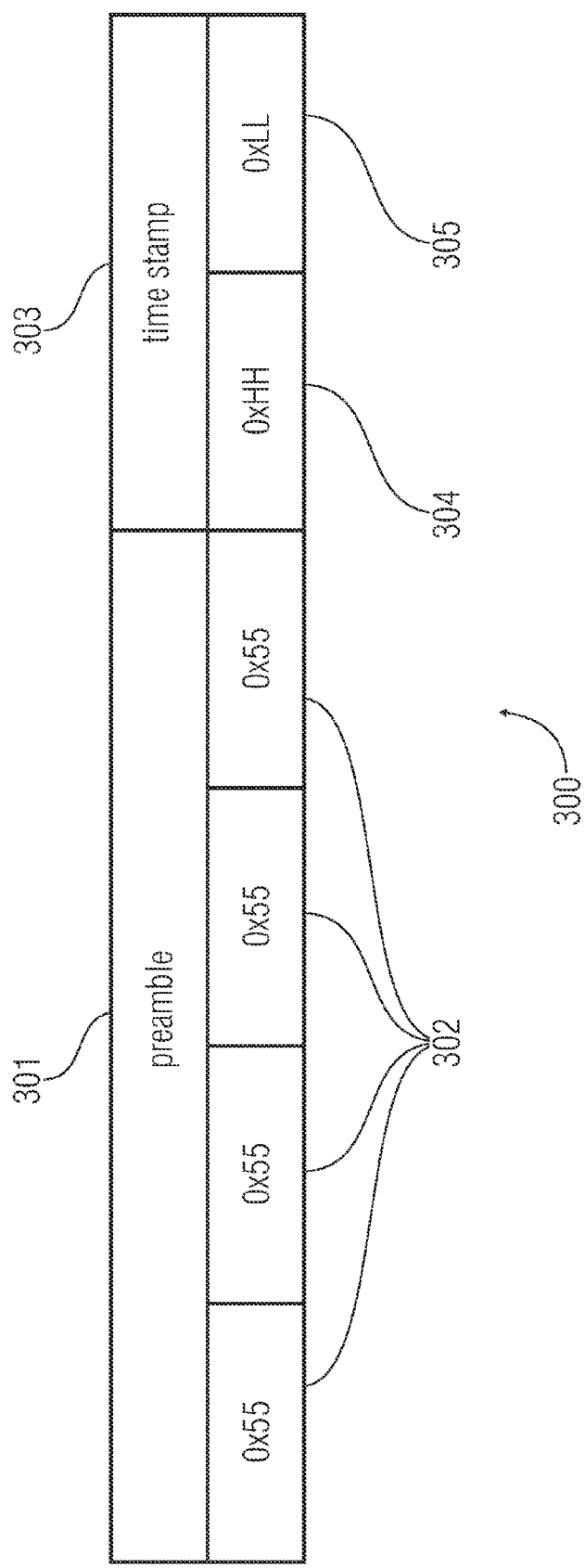
FIG. 3 shows an example of a packet sequence mark.

FIG. 3 shows an example of a packet sequence mark 300 that may correspond to any of the two packet sequence marks 212, 213 of FIG. 2. In this example, the packet sequence mark 300 is configured as a counter, or count, which here may also be referred to as a time stamp 303, and comprises a lower data word 305 consisting of 8 bits and an upper data word 304 consisting of 8 bits. In this embodiment, the time stamp 303 directly follows a preamble or synchronization word 301 comprising four uniform data words 302 that are 8 bits wide and each have the content "0x55". Other formats and longer or shorter time stamps 303 are also possible. In an alternative embodiment it is possible, e.g., to overwrite the packet sequence mark 300 onto a data packet 230 and to search for the preamble 301 within the receiver so as to determine the time stamp 303, which may be configured as a counter.

This embodiment shows a possible implementation of the packet sequence mark 300. It is also possible to use other word widths for the preamble 301 and for the time stamp 303, or to use other values for the preamble data words 302 and for the two time stamp data words 304, 305. Also, the time stamp 303 may comprise, instead of a counter, a time that may be specified, e.g., in a manner that is synchronous with a sampling time of the sampler 201. The packet sequence mark 300 may also be added in front of or behind a data packet 230 or may be inserted into a data packet 230 without overwriting the data.

Figure 4:
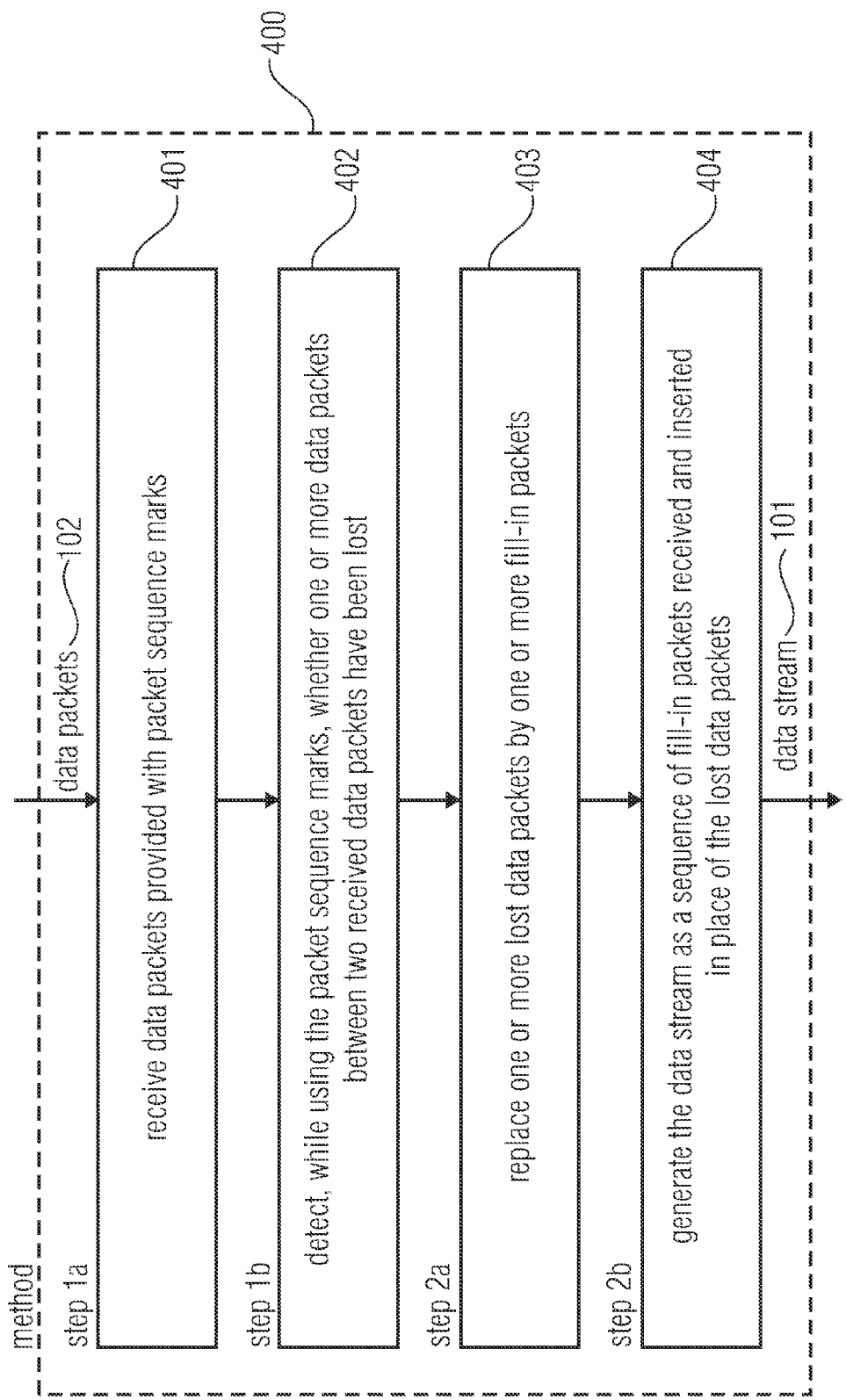
FIG. 4 shows a flowchart of a method of generating a data stream in accordance with an embodiment.

FIG. 4 shows a flowchart of a method 400 of generating a data stream in accordance with an embodiment. The method 400 generates, from data packets 102 provided with packet sequence marks 103, a data stream 101 as a sequence of received data packets 111, 114 and of fill-in packets 132, 133 inserted in place of the lost data packets 112, 113. The method may comprise four steps, for example; in a first step (step 1a) 401, data packets 102 provided with packet sequence marks 103 may be received. In a second step (step 1b) 402, the method 400 may detect whether one or more data packets 112, 113 between two received data packets 111, 114 have been lost, for example while using the packet sequence marks 103. A third step (step 2a) 403 may comprise, for example, replacing one or more lost data packets 112, 113 by one or more fill-in packets 132, 133 of the same lengths as those of the lost data packets 112, 113. Finally, in a fourth step (step 2b) 404, the method 400 may generate the data stream 101 as a sequence of received data packets 111, 114 and of fill-in packets 132, 133 inserted in place of the lost data packets 112, 113. After each reception of data packets 102, the four steps 401, 402, 403, 404 of the method 400 may be cycled through once again.

Figure 5:
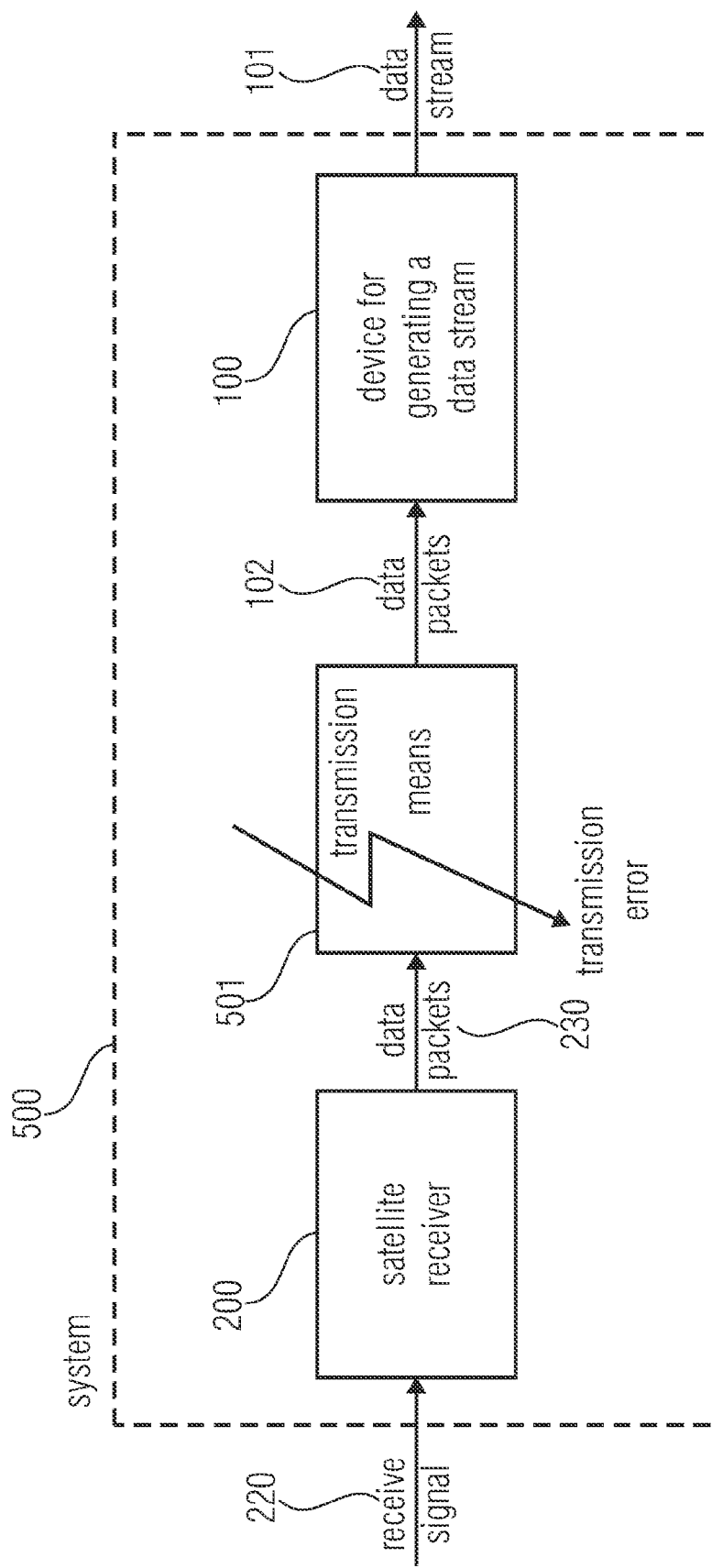
FIG. 5 shows a block diagram of a system for transmitting data packets that are based on a receive signal, in accordance with an embodiment.

FIG. 5 shows a block diagram of a system 500 for transmitting data packets 230 that are based on a receive signal 220, in accordance with an embodiment. The system 500 may comprise a satellite receiver 200, a device 100 for generating a data stream 101, as well as a transmission means 501 that may be connected between the satellite receiver 200 and the device 100 for generating a data stream 101, so that the device 100 for generating a data stream 101 is fed the output signal 230 of the satellite receiver 200. The system 500 may transmit, e.g., a receive signal 220 that has been received from a satellite from a satellite receiver 200 to a device 100 for generating a data stream 101 so as to represent the receive signal 220 as a data stream 101.

The transmission means 501 may asynchronously transmit, e.g., data packets 230, for example by means of a unidirectional transmission of the data packets 230 without any reverse channel. The transmission means 501 may be configured to transmit the data packets 230 without any redundancy. The output signal 101 of the device 100 for generating a data stream is configured, for example, to have a time correlation with the output signal 230 of the satellite receiver 200. For example, the transmission means 501 is capable of transmitting the data packets 230 under the influence of intense disturbances, said disturbances being able to effect individual packet losses. The data packets 230 may be transmitted via a non-fail-safe transmission channel 501 and may have packet losses at the receiver, i.e. at the device 100 for generating a data stream 101. For example, the satellite receiver 200 may generate a continuous data stream of data packets 230 from the received receive signal 220, and may transmit said continuous data stream to the device 100. The device 100 for generating a data stream 101 may then generate, e.g. from the received data packets 102 and the one or more fill-in packets 106, a continuous data stream 101 of data packets 102 and fill-in packets 106.

For adjusting the location at which the packet sequence mark 103 is attached on the data packets 230, the system 500 may provide, e.g., an external channel by means of which the satellite receiver 200 may communicate the corresponding location to the device 100 for generating a data stream 101. Conversely, the device 100 for generating a data stream 101 may also communicate the position of the packet sequence mark 103 to the satellite receiver 200 via the external channel. The position may also be communicated, by the system 500, to the satellite receiver 200 and to the device 100 for generating a data stream 101 upon switch-on, or the system 500 may determine the position from a fixed quantity present, e.g., within the satellite receiver 200 or the device 100 for generating a data stream.

A further method of detecting the packet sequence mark 103 may comprise, e.g., searching the received data packets 111, 114 for a predetermined preamble 301 or a synchronization pattern 301, which was attached, e.g., at a predetermined location by the satellite receiver 200 during generation of the data packets 230 so as to mark the time stamp 303 following, e.g., the preamble 301.

In an alternative embodiment, the sequence of samples 203 may initially be provided, for example, with packet sequence marks in that packet sequence marks 103, which normally are located at the same position in different data packets, are attached at a distance of, e.g., 1024 values. The packet sequence marks 103 consist of one or more values that overwrite the data, for example the samples. However, in some cases it may also occur that the data packet generator 202 does not always attach the packet sequence marks 103 at the same locations within the data packet 230, for example due to disturbances. I.e., the mark may vary within the data packet 230.

In a further embodiment, the sequence of samples 203 may be subdivided into data packets 210, 211 (for example after attaching the packet sequence marks). This subdivision, however, may be faulty, and a loss of values during packetizing cannot be ruled out. However, since the packet sequence marks 103 were already attached previously, the synchronicity will not be impaired by errors in packetizing. The data packet loss detector 104 searches, for example, for the preamble 301 under the assumption that the position of the preamble 301 will not change from one data packet 210 to the next data packet 211. The preamble 301 and the time stamp 303 may have a fixed mutual relationship. For example, the time stamp 303 may immediately follow the preamble 301. Should the preamble 301 not be found at the expected location, the entire data packet 210, 211 may be searched for the preamble 301. If a data packet 210, 211 contains no preamble 301, it may be discarded, for example. The temporal relationship of the data within the data packet 210, 211 may be understood to be relative to the packet sequence mark 103, which means that, if the packet sequence mark 103 is shifted by, e.g., 100 values from one data packet 210 to the next data packet 211, 100 fill-in values are inserted, for example, within the data packet processor 105 (under the assumption that the packet sequence mark 103 has changed accordingly, for example that the counter reading 303 has increased by one and that no entire data packet 210, 211 has been lost).

Figure 6:
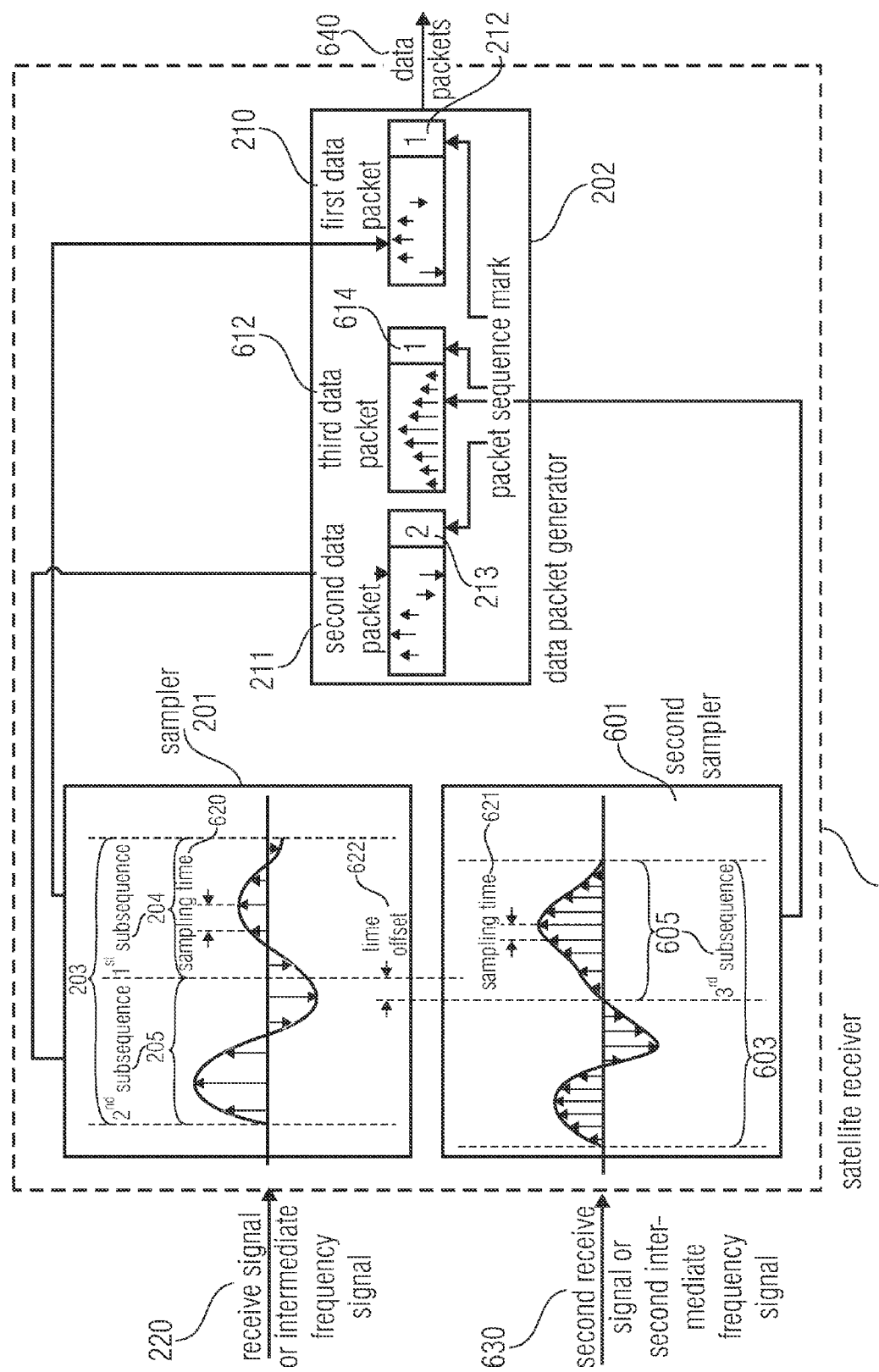
FIG. 6 shows a block diagram of a satellite receiver for providing data packets that are based on two receive signals, in accordance with a further embodiment.

FIG. 6 shows a block diagram of a satellite receiver 200 for providing data packets 640 that are based on receive signals 230, 630, in accordance with a further embodiment. The difference as compared to the embodiment of FIG. 2 may consist in that the satellite receiver 200 of the embodiment of FIG. 2 may comprise only one receive signal 220 or intermediate frequency signal 220, whereas in the embodiment of FIG. 6 a second receive signal 630 or a second intermediate frequency signal 630 may be available which may be processed, for example, by a second sampler 601, whereas the sampler 201 may process the (first) receive signal 220 or intermediate frequency signal 220.

The second sampler 601 may generate a third subsequence 605 of samples, for example from a second receive signal 630 or second intermediate frequency signal 630, which third subsequence 605 may be used by the data packet generator 202 for generating a third data packet 612, which may comprise a third packet sequence mark 614 and the third subsequence 605. The sampler 201 may be temporally coupled to the second sampler 601, for example, which is representable, e.g., by a time offset 622 with which the third subsequence 605 is formed after the first subsequence 204. For example, the first packet sequence mark 212 and the third packet sequence mark 614 may be identical if the temporal relationship between the first subsequence 204 of samples of the sampler 201 and the third subsequence 605 of samples of the second sampler 604 may be described by a time offset 622 between the first subsequence 204 and the third subsequence 604 that lies within a tolerance interval. For example, it is possible for the sampler 201 and the second sampler 601 to operate at different sampling times, for example at the sampling time 620 of the sampler 201, and at the sampling time 621 of the second sampler 601, which may be different in length. For example, the first data packet 210 and the third data packet 612 may have the same packet sequence mark 212, 614 assigned to them when the time offset 622 between both subsequences lies within a tolerance interval or in an ideal case is approximately zero, for example.

For example, the tolerance interval may be determined from the longer one of the two sampling times 620, 621 of the sampler 201 and the second sampler 601. In this case, it is assumed that sampling of the last element of the first subsequence 204 and sampling of the last element of the third subsequence 605 occur almost simultaneously, it being possible for a temporal concurrency to be represented here by means of a resolution in steps of the sampling time 620. In this embodiment, for example, the sampling time 620 may indicate the less precise representation as compared to the sampling time 621, which is why the sampling time 620 may represent a boundary for time resolution, for example. In an alternative embodiment, the sampling time 620 of the sampler 201 may correspond to the sampling time 621 of the second sampler 601.

Since the data packet generator 202 in this embodiment may generate two data packets 210, 612 having the same packet sequence mark 212, 614, said data packets in this embodiment each having the value of "1", it may be useful, for example, to differentiate the data packets 640 generated by the satellite receiver 200 in a device 100 for generating a data stream 101 so as not to generate a single data stream 101 from the first data packet 210 and the third data packet 612, which here originate from two different receive signals 220, 630, but so as to assign different data packets 210, 612 to different data streams 101 generated. This may be realized, for example, in that the data packet generator 202 is designed to provide the data packets 210, 612, 211 with a channel mark indicating whether the generated data packet 640 comprises a subsequence 204, 205 of the samples of the sampler 201, or a subsequence 605 of the samples of the second sampler 601. The channel mark may already be contained, e.g., within information of the receive signal 220 or of the second receive signal 630. However, alternatively or additionally, it may also be attached within the packet sequence mark 212, 614, 213, or it may comprise another part of the data packet 210, 612, 211.

Figure 7:
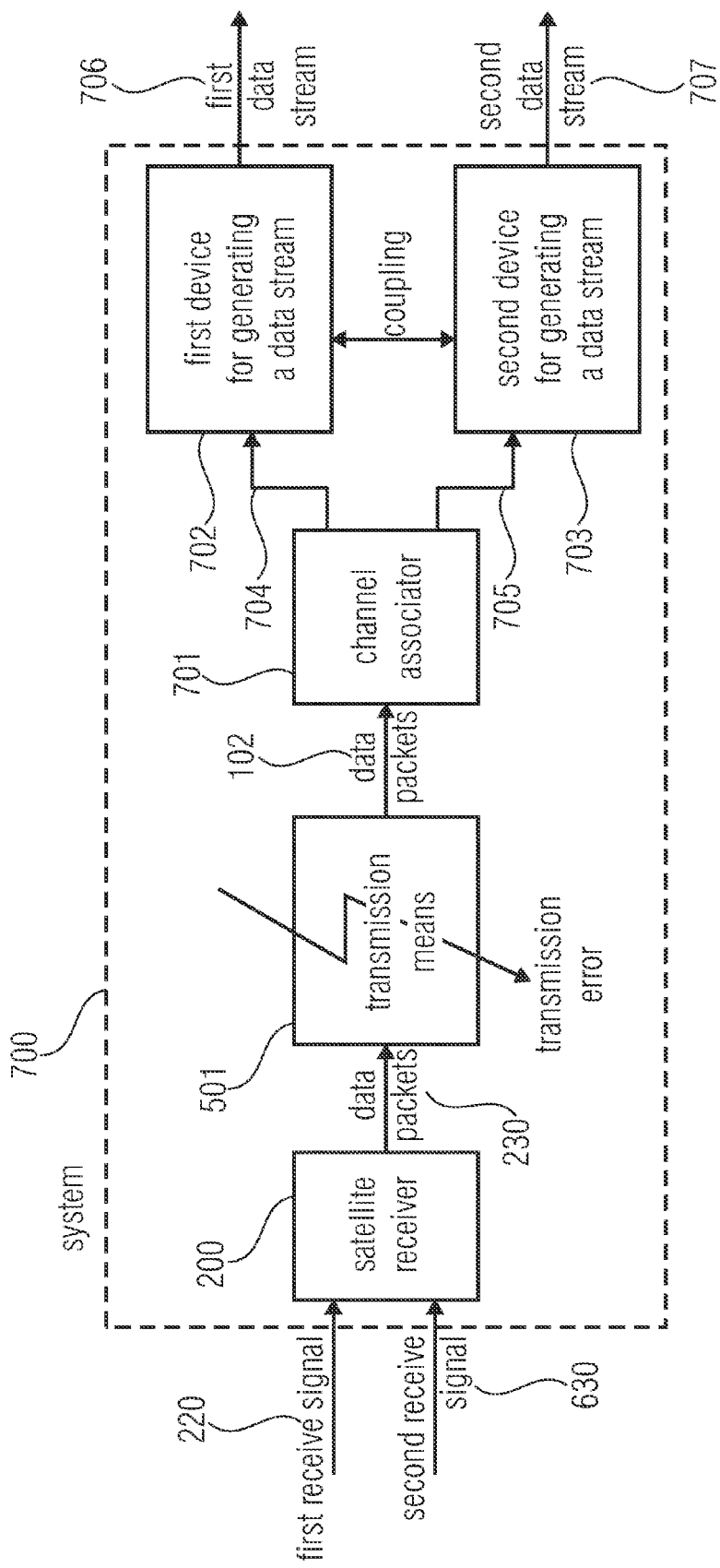
FIG. 7 shows a block diagram of a system for transmitting data packets that are based on two receive signals, in accordance with an embodiment.

FIG. 7 shows a block diagram of a system 700 for transmitting data packets 230 that are based on two receive signals 220, 630, in accordance with an embodiment. The system 700 comprises a satellite receiver 200, which may evaluate, e.g., a receive signal 220 and a second receive signal 630, and may be configured, for example, in accordance with the embodiment of FIG. 6. In addition, the system 700 comprises a first device 702 for generating a data stream 706 and a second device 703 for generating a data stream 707, which may be coupled to each other. The system 700 may further comprise a transmission means 501 that may be designed in accordance with the embodiment of the system of FIG. 5 and which may be adapted, for example, to be connected between the satellite receiver 200 and a channel associator 701, so that the channel associator 701 may have the output signal 230 of the satellite receiver 200 fed to it. The system 700 may comprise a channel associator 701 which may feed, e.g., the received data packets 102 to the first device 702 for generating a data stream 706 or to the second device 703 for generating a data stream 707 while using a channel mark.

Unlike the embodiment of the system 500 of FIG. 5, wherein a data stream 101 may be generated from a receive signal 220, the system 700 may be adapted such that a first data stream 706 may be generated from a receive signal 220, and a second data stream 707 may be generated from a second receive signal 630. In this embodiment, the satellite receiver 200 may be capable of processing two receive signals 220, 630. The generated data packets 230 may comprise a channel association, which may be evaluated by the channel associator 701 so as to thereby subdivide the corresponding data packets 102 into two streams of data packets 704, 705, which may be fed to the first device 702 or to the second device 703, depending on the channel association.

For example, the first device 702 and the second device 703 may be coupled to each other by a common clock line, by means of which they may generate synchronous first and second data streams 706, 707 from received data packets 704, 705 comprising the same packet sequence mark 103. Thus, for example, a cross correlation from the second data stream 707 to the first data stream 706 and/or from the second receive signal 630 to the first receive signal 220 may be evaluated, so that a more precise resolution may be enabled with a correlation of two input signals 220, 630, which may belong to different frequency bands. Alternatively or additionally, the first data stream 706 may be correlated with a first correlation pattern, and the second data stream 707 may be correlated with a second correlation pattern, it being possible for said two correlation patterns to differ from each other. The two correlation patterns may be different, for example. The results of the two above-mentioned correlations may be processed together (e.g. in a combining manner), for example.

Embodiments of the invention relate to satellite navigation receivers, for example, that have an asynchronous interface enabling no bidirectional transmission due to the limited transmission capacity. Whereas with bidirectional transmissions, in the event of non-fail-safe transmission links, there is a process referred to as a "handshake", wherein the receiver may once again request the defective or non-transmitted packets, this is not a realizable process for satellite navigation receivers that do not allow bidirectional transmission due to the limited transmission capacity.

In one embodiment it is possible, e.g., by means of the inventive method to transmit digital signals via a non-fail-safe unidirectional transmission link with a low protocol overhead, so that unambiguous association of the measurement time of the individual signal values is possible at the receiver. A specific embodiment of the method may comprise four steps: a first step may comprise grouping into packets, a second step may comprise providing the packets with a time stamp, a third step may comprise transmitting the packets, and a fourth step may comprise reconstructing the packets. The method steps of this specific embodiment will be described in the following.

The first step may comprise grouping into packets. The data stream within the non-fail-safe unidirectional transmission channel may consist of a succession of packets. For example, the transmitter may send data packets of equal lengths. On the transmitter side, a specific number of coherent data bytes within each packet may be overwritten by a time stamp by means of a suitable circuit. This time stamp may take on two tasks, for example. A counter contained within the time stamp may provide each packet with the current counter reading, which is increased by one for each new packet. By comparing the previous and the current counter readings, the receiver may be enabled to detect whether a packet has been lost. On the other hand, the time stamp usually can be found, under normal conditions, at the same position within the packet, for example following initialization. In this manner, the receiver additionally has the information that the packet was correctly generated at the transmitter. In case of deviations, the receiver may respond accordingly.

The position at which the time stamp is located within the packet may also vary. For example, the position is not yet specified during initialization. Following initialization, in some embodiments, the position is specified in case of faultless operation, and the time stamp is located at the initialized predefined position at least up to subsequent re-initialization. The system may be adapted, for example, to detect a position of the time stamp or a change in the position of the time stamp between successive packets. In case of a deviation, or "slipping", of the time stamp from the predefined position, the system may therefore conclude defective transmission and report a transmission error, for example.

If several frequency bands are sampled, the frequency bands may be sampled synchronously with one another. Attaching the time stamp on the individual data streams may be effected by overwriting samples measured at the same point in time. Thus, synchronization over several frequency bands may be ensured.

A second step of the method may comprise attaching a time stamp or packet sequence mark 300 on the data packets. The packet sequence mark 300 may consist of a preamble 301 comprising, e.g., a defined byte sequence and, e.g., a 16-bit counter 303. Following a counter overflow, said counter may start again at the starting value. The preamble 301 may serve, for example, to find the time stamp 303 within the data stream. For example, FIG. 3 shows the format of the packet sequence mark 300 as may be used in an embodiment. Other formats and longer or shorter time stamps 303 are also possible. FIG. 3 shows, e.g., the time stamp 303 in a prototype implementation in hexadecimal notation, wherein the data word 304 (0xHH) may represent the 8 upper bits of the stamp, and the data word 305 (0xLL) may represent the 8 lower bits of the stamp.

A third step of the method may comprise the transmission. The data transmission may be an asynchronous transmission. Said transmission is unidirectional, for example, i.e. there is no reverse channel for being able to request a packet once again, and there is no redundancy in the data transmitted. A packet that does not arrive at the receiver may then be detected as missing by the method presented here, so as to be considered accordingly in further processing.

A fourth step of the method may comprise reconstruction. For reconstructing a continuous data stream, or several synchronized continuous data streams, the time stamp 303 may be read out for each packet on the receive side. The position of the packet within the data stream may be defined from the value of the time stamp 303. Any missing packets may be detected in that the difference in the time stamps 303 between the currently received packet and the packet received last is different from 1. The missing packets may be replaced by so-called zero packets on the receive side.

Once the packets of a certain counter reading have been received and/or replaced by zero packets for all of the frequency bands, they may be forwarded to the signal processing of the receiver.

It may be recommendable, for example, to inform the user about the number of packets lost. A high number of packets lost may indicate other hardware problems, for example.

The content of the zero packets is to be selected, e.g., such that they have as little effect as possible on the receiver. It is possible, for example, to select all of the values within the zero packet to be zero, or to select the samples within the zero packet purely at random.

The reconstruction is limited by the maximum value of the time stamp 303. In one embodiment, the method described may work, e.g., as long as the number of packets lost between two successively received packets within a data stream is smaller than the maximum value of the time stamp 303. If more packets are lost, for example, the correct number of the packets lost can no longer be established on the receive side unless a rough estimation of the number of packets lost is available via a further source of information, e.g. a PC clock.

In a further embodiment, the effectiveness, or efficiency, of fleet management on the part of, e.g., traffic enterprises or of the transport services may be increased by the inventive concept in that the correlation of the data packets (e.g. with a reference pattern) is no longer performed within the vehicle, for example, but in a control room. The control room may provide, e.g., a larger computing capacity and have an overview of the data of several vehicles. Moreover, the satellite receiver 200 within the vehicle may have been designed—while utilizing the inventive method—to be very compact, and need not provide any large computing capacity—or, in the ideal case, no computing capacity at all—for correlation calculations, for example if said computing steps are performed by the control room, for example. For example, the control room might then inform the vehicles of their current positions via a control channel while using control instructions.

The satellite receiver 200, for example, may also have a USB (universal serial bus) interface or an alternative bidirectional interface having transmission errors which may be used, for example, for transmitting the data packets 230 to the device 100. Even if a USB interface allows, e.g., bidirectional data transmission, it may be employed in an embodiment of the inventive method. Operating a bidirectional interface in a unidirectional manner and performing receiver-side evaluation while using the concept described here or while using correlation methods may be more efficient, for example, than causing a renewed request of the defective packets for each error, for example. Control information, for example, might be transmitted at a lower data rate within the reverse channel of the bidirectional interface.

The device 100 for generating a data stream 101, the satellite receiver 200 as well as the components of the systems 500, 700 for transmitting data packets that are based on a receive signal of a satellite receiver and are provided with packet sequence marks may be designed in digital or analog logic, for example as electronic or photonic circuits.

Depending on the conditions, the inventive method may be implemented in hardware or in software. Implementation may be on a digital storage medium, in particular a disk or CD having electronically readable control signals which may cooperate with a programmable computer system such that the corresponding method is performed. Generally, the invention thus also consists in a computer program product having a program code, stored on a machine-readable carrier, for performing the inventive method, when the computer program product runs on a computer. In other words, the invention may thus be realized as a computer program having a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device configured to determine a position of a satellite receiver on the basis of data packets that are received from the satellite receiver, comprise a satellite signal, and are provided with packet sequence marks, the device comprising:

a packet loss detector configured to detect, while using the packet sequence marks, whether one or more data packets between two received data packets have been lost; and a data packet processor configured to replace the one or more lost packets by one or more fill-in packets so as to generate a data stream as a sequence of the received data packets and of the fill-in packets inserted in place of the lost data packets;

a correlator configured to correlate the data stream with a reference data sequence so as to acquire a correlation result; and a position determiner configured to determine the position of the satellite receiver based on the correlation result; wherein the packet loss detector is configured to determine a number of lost data packets between two successively received data packets by evaluating a relationship between the packet sequence marks of the two successively received data packets; and the packet sequence marks are configured as counters, and wherein the packet loss detector is configured to determine the number of lost data packets while using the difference of the counter readings of the two counters within two successively received data packets.

2. The device as claimed in claim 1, wherein the data packet processor is configured to generate the data stream such that the received data packets are arranged within the data stream in accordance with their packet sequence mark, and such that the one or more fill-in packets are arranged in accordance with a temporal position of the associated lost data packets.

3. The device as claimed in claim 1, wherein the received data packets each comprise the same length.

4. The device as claimed in claim 1, wherein the data packet processor is configured to generate the one or more fill-in packets with the same length as that of the lost packets in each case.

5. The device as claimed in claim 3, wherein the data packet processor is configured to generate the one or more fill-in packets with the length of the one or more received data packets.

6. The device as claimed in claim 1, wherein the data packet processor is configured to use a packet that comprises a sequence of values that occurs in no received data packet as at least one of the fill-in packets.

7. The device as claimed in claim 1, wherein the data packet processor is configured to use a zero packet that comprises a sequence of zero values as at least one of the fill-in packets.

8. The device as claimed in claim 1, wherein the data packet processor is configured to generate at least one of the fill-in packets as a random packet that comprises a sequence of randomly generated values, of values generated using a random number generator, or of values generated using a pseudo-random number generator.

9. The device as claimed in claim 1, wherein the packet loss detector is configured to determine the packet sequence mark by evaluating data at a predetermined location within the one or more data packets.

10. The device as claimed in claim 9, wherein the predetermined location within the one or more data packets that is evaluated in order to determine the packet sequence mark is the same for all of the data packets.

11. The device as claimed in claim 1, wherein the packet loss detector is configured to determine the packet sequence mark by detecting a specific sequence of values within the one or more data packets, said packet sequence mark comprising, in a defect-free case, a specific positional relationship to the specific sequence of values, the packet loss detector being configured to detect a loss of data packet values within a data packet if a positional relationship of the packet sequence mark deviates from an expected positional relationship.

12. The device as claimed in claim 11, wherein the specific positional relationship is constituted by the fact that the packet sequence mark is a data word that follows the specific sequence of values within the one or more data packets.

13. The device as claimed in claim 1, the device further comprising a clock for determining time information, and wherein the packet loss detector is configured to detect—using the difference of the counter readings of the two counters within two successively received data packets, and time information that carry information about when the two successively received data packets were received—a counter overflow of one of the two counters, and to determine the number of lost packets while using the difference of the counter readings of the two counters and the time information.

14. A device configured to determine a position of a satellite receiver on the basis of data packets that are received from the satellite receiver, comprise a satellite signal, and are provided with packet sequence marks, the device comprising:

a packet loss detector configured to detect, while using the packet sequence marks, whether one or more data packets between two received data packets have been lost; and a data packet processor configured to replace the one or more lost packets by one or more fill-in packets so as to generate a data stream as a sequence of the received data packets and of the fill-in packets inserted in place of the lost data packets;

a correlator configured to correlate the data stream with a reference data sequence so as to acquire a correlation result; and a position determiner configured to determine the position of the satellite receiver based on the correlation result; wherein the packet loss detector is configured to determine a number of lost data packets between two successively received data packets by evaluating a relationship between the packet sequence marks of the two successively received data packets; and the device is configured to communicate the number of lost data packets to an operator so as to enable error evaluation or diagnosis.

15. A device configured to determine a position of a satellite receiver on the basis of data packets that are received from the satellite receiver, comprise a satellite signal, and are provided with packet sequence marks, the device comprising:

a packet loss detector configured to detect, while using the packet sequence marks, whether one or more data packets between two received data packets have been lost; and a data packet processor configured to replace the one or more lost packets by one or more fill-in packets so as to generate a data stream as a sequence of the received data packets and of the fill-in packets inserted in place of the lost data packets;

a correlator configured to correlate the data stream with a reference data sequence so as to acquire a correlation result; and a position determiner configured to determine the position of the satellite receiver based on the correlation result; wherein the packet loss detector is configured to determine the packet sequence mark by evaluating data at a predetermined location within the one or more data packets;

the predetermined location within the one or more data packets that is evaluated in order to determine the packet sequence mark is the same for all of the data packets; and the device is configured to communicate a deviation of the packet sequence mark from a predetermined position at which the data packets are provided with a packet sequence mark to an operator so as to enable error evaluation or diagnosis.

16. The device as claimed in claim 1, wherein the data packet processor is configured to replace a lost data packet by a fill-in packet in each case.

17. The device as claimed in claim 1, wherein the device further comprises:
 a packet sorter configured to sort the one or more data packets in the order predefined by the packet sequence marks and to feed a sorted sequence of data packets to the pass loss detector.

18. A device configured to determine a position of a satellite receiver on the basis of data packets that are received from the satellite receiver, comprise a satellite signal, and are provided with packet sequence marks, the device comprising:
 a packet loss detector configured to detect, while using the packet sequence marks, whether one or more data packets between two received data packets have been lost; and
 a data packet processor configured to replace the one or more lost packets by one or more fill-in packets so as to generate a data stream as a sequence of the received data packets and of the fill-in packets inserted in place of the lost data packets;
 a correlator configured to correlate the data stream with a reference data sequence so as to acquire a correlation result; and
 a position determiner configured to determine the position of the satellite receiver based on the correlation result; wherein
 the packet loss detector is configured to determine positions of the packet sequence marks within two successive data packets and to detect, while using the determined positions of the packet sequence marks, whether one or more data packet values of the two received successive data packets have been lost.

19. The device as claimed in claim 18, wherein the data packet processor is configured to replace the one or more lost data packet values by one or more fill-in values comprising the same lengths as those of the lost data packet values.

20. The device as claimed in claim 18, wherein the packet loss detector is configured to determine a number of lost data packet values between two successively received data packets by evaluating the locations at which the packet sequence marks are located within the received data packets in relation to one another or to a predetermined location.

21. A method of determining a position of a satellite receiver on the basis of data packets that are received from the satellite receiver, comprise a satellite signal, and are provided with packet sequence marks,
 the method comprising:
 detecting, while using the packet sequence marks, whether one or more data packets between two received data packets have been lost;
 replacing the one or more lost packets by one or more fill-in packets so as to generate a data stream as a sequence of the received data packets and of the fill-in packets inserted in place of the lost data packets;
 correlating the data stream with a reference data sequence so as to acquire a correlation result; and
 determining the position of the satellite receiver based on the correlation result; wherein
 a number of lost data packets between two successively received data packets is determined by evaluating a relationship between the packet sequence marks of the two successively received data packets; and
 the packet sequence marks are configured as counters, and wherein the number of lost data packets is determined while using the difference of the counter readings of the two counters within two successively received data packets.

22. A system configured to transmit data packets that are based on a receive signal of a satellite receiver, comprise the receive signal, and are provided with packet sequence marks, and to determine a position of the satellite receiver, the system comprising:
 a satellite receiver configured to provide data packets that are based on a satellite signal, comprising:
 a sampler configured to sample the satellite signal or an intermediate frequency signal derived therefrom so as to acquire a sequence of samples for the satellite signal;
 a data packet generator configured to generate a first data packet comprising a first subsequence of the samples, and to generate a second data packet comprising a second subsequence of the samples, the data packet generator being configured to provide the first data packet with a first packet sequence mark and to provide the second data packet with a second packet sequence mark, the packet sequence marks describing a temporal relationship between the first subsequence of samples and the second subsequence of samples; and
 a device configured to determine a position of a satellite receiver on the basis of data packets that are received from the satellite receiver, comprise a satellite signal, and are provided with packet sequence marks, the device comprising:
 a packet loss detector configured to detect, while using the packet sequence marks, whether one or more data packets between two received data packets have been lost, and
 a data packet processor configured to replace the one or more lost packets by one or more fill-in packets so as to generate a data stream as a sequence of the received data packets and of the fill-in packets inserted in place of the lost data packets;
 a correlator configured to correlate the data stream with a reference data sequence so as to acquire a correlation result, and
 a position determiner configured to determine the position of the satellite receiver based on the correlation result; and
 a transmitter connected between the satellite receiver and the device configured to determine the position of the satellite receiver, such that the device configured to determine the position of the satellite receiver is fed the output signal of the satellite receiver; wherein
 in the satellite receiver, the data packet generator is configured to use, to provide the packet sequence mark, a counter which provides the data packets with a counter reading, wherein data packets comprising different subsequences of the samples are provided with different counter readings.

23. The system as claimed in claim 22, wherein in the satellite receiver, the data packet generator is configured to overwrite at least a portion of the data packets with the associated packet sequence mark, so that data is lost due to said act of overwriting.

24. The system as claimed in claim 22, wherein in the satellite receiver, the data packet generator is configured to add the packet sequence mark in front of or behind the associated data packets or to insert them within the associated data packet, so that no data is lost.

25. The system as claimed in claim 22, wherein in the satellite receiver, the data packet generator is configured to provide the data packets with the associated packet sequence mark at the same location in each case.

26. The system as claimed in claim 22, wherein in the satellite receiver, the data packet generator is configured to specify, during an initialization of the satellite receiver, a position at which the data packets are provided with the packet sequence mark, and wherein the data packet generator is configured to provide any data packets that are transmitted after the initialization with the packet sequence marks at the position specified during the initialization.

27. The system as claimed in claim 22, wherein in the satellite receiver, the data packet generator is configured to use, as the packet sequence mark, a time stamp that provides the data packets with time information derived from a sampling time of the sampler at which a specific element of the subsequence associated with the data packet was sampled.

28. The system as claimed in claim 22, wherein in the satellite receiver, the counter is configured to count up or count down by a predefined number so as to acquire a packet sequence mark for a next subsequence of the samples.

29. A system configured to transmit data packets that are based on a receive signal of a satellite receiver, comprise the receive signal, and are provided with packet sequence marks, and to determine a position of the satellite receiver, the system comprising:
a satellite receiver configured to provide data packets that are based on a satellite signal, comprising:
a sampler configured to sample the satellite signal or an intermediate frequency signal derived therefrom so as to acquire a sequence of samples for the satellite signal;
a data packet generator configured to generate a first data packet comprising a first subsequence of the samples, and to generate a second data packet comprising a second subsequence of the samples, the data packet generator being configured to provide the first data packet with a first packet sequence mark and to provide the second data packet with a second packet sequence mark, the packet sequence marks describing a temporal relationship between the first subsequence of samples and the second subsequence of samples; and
a device configured to determine a position of a satellite receiver on the basis of data packets that are received from the satellite receiver, comprise a satellite signal, and are provided with packet sequence marks, the device comprising:
a packet loss detector configured to detect, while using the packet sequence marks, whether one or more data packets between two received data packets have been lost, and
a data packet processor configured to replace the one or more lost packets by one or more fill-in packets so as to generate a data stream as a sequence of the received data packets and of the fill-in packets inserted in place of the lost data packets;
a correlator configured to correlate the data stream with a reference data sequence so as to acquire a correlation result, and
a position determiner configured to determine the position of the satellite receiver based on the correlation result; and
a transmitter connected between the satellite receiver and the device configured to determine the position of the satellite receiver, such that the device configured to determine the position of the satellite receiver is fed the output signal of the satellite receiver; wherein
in the satellite receiver, the data packet generator is configured to overwrite the data packets, for packet sequence marking, with a synchronization word and a subsequent counter reading, the synchronization word and the subsequent counter reading overwriting the data packets at the same location in each case.

30. The system as claimed in claim 29, wherein in the satellite receiver, the synchronization word comprises a 32-bit wide data word with alternating data bits, and wherein the counter comprises a 16-bit wide data word.

31. A system configured to transmit data packets that are based on a receive signal of a satellite receiver, comprise the receive signal, and are provided with packet sequence marks, and to determine a position of the satellite receiver, the system comprising:
a satellite receiver configured to provide data packets that are based on a satellite signal, comprising:
a sampler configured to sample the satellite signal or an intermediate frequency signal derived therefrom so as to acquire a sequence of samples for the satellite signal,
a data packet generator configured to generate a first data packet comprising a first subsequence of the samples, and to generate a second data packet comprising a second subsequence of the samples, the data packet generator being configured to provide the first data packet with a first packet sequence mark and to provide the second data packet with a second packet sequence mark, the packet sequence marks describing a temporal relationship between the first subsequence of samples and the second subsequence of samples; and
a device configured to determine a position of a satellite receiver on the basis of data packets that are received from the satellite receiver, comprise a satellite signal, and are provided with packet sequence marks, the device comprising:
a packet loss detector configured to detect, while using the packet sequence marks, whether one or more data packets between two received data packets have been lost, and
a data packet processor configured to replace the one or more lost packets by one or more fill-in packets so as to generate a data stream as a sequence of the received data packets and of the fill-in packets inserted in place of the lost data packets;
a correlator configured to correlate the data stream with a reference data sequence so as to acquire a correlation result, and
a position determiner configured to determine the position of the satellite receiver based on the correlation result; and
a transmitter connected between the satellite receiver and the device configured to determine the position of the satellite receiver, such that the device configured to determine the position of the satellite receiver is fed the output signal of the satellite receiver; wherein
the satellite receiver further comprises a second sampler configured to sample a second satellite signal or a second intermediate frequency signal derived therefrom so as to acquire a sequence of samples for the second satellite signal; and
the data packet generator is configured to generate a third data packet comprising a third subsequence of the sequence of samples of the second sampler, and wherein the data packet generator is configured to provide the third data packet with a third packet sequence mark, the first packet sequence mark and the third packet sequence mark describing a temporal relationship between the first subsequence of samples of the sampler and the third subsequence of samples of the second sampler.

32. The system as claimed in claim 31, wherein in the satellite receiver, the data packet generator is configured to provide the data packets with a channel mark indicating whether the generated data packet comprises a subsequence of the samples of the sampler or a subsequence of the samples of the second sampler.

33. The system as claimed in claim 31, wherein in the satellite receiver, the second sampler is configured to temporally couple the sampling of the second receive signal or of the second intermediate frequency signal derived therefrom to the sampling, performed by the sampler, of the receive signal or of the intermediate frequency signal derived therefrom.

34. The system as claimed in claim 31, wherein in the satellite receiver, the data packet generator is configured to provide the first subsequence and the third subsequence with identical packet sequence marks when a time offset between an initial sampling time of the first subsequence and an initial sampling time of the third subsequence is within a tolerance interval.

35. The system as claimed in claim 22, wherein in the satellite receiver, the data packet generator is configured to generate the data packets with the same length.

36. The system as claimed in claim 22, wherein the receive signal is a CDMA signal.

37. The system as claimed in claim 22, wherein the satellite receiver is configured to communicate a position at which the data packets are provided with a packet sequence mark to the device via the transmitter or via an external channel, or wherein the device is configured to communicate the position to the satellite receiver via an external channel, or wherein the system is configured to communicate the position to the satellite receiver and to the device upon switch-on, or wherein the system is configured to determine the position from a fixed quantity present within the satellite receiver or the device or the system, or wherein the device is configured to determine a position at which the data packets are provided with a packet sequence mark on the basis of an identification of a preamble within the data packets.

38. The system as claimed in claim 22, wherein the transmitter is configured to asynchronously transmit the data packets.

39. The system as claimed in claim 22, wherein the transmitter is configured to transmit the data packets in a unidirectional manner without any reverse channel.

40. The system as claimed in claim 22, wherein the transmitter is configured to transmit the data packets without any redundancy.

41. The system as claimed in claim 22, wherein the transmitter is configured to transmit the data packets in a non-fail-safe manner.

42. The system as claimed in claim 22, wherein the output signal of the satellite receiver comprises a time correlation with the output signal of the device.

43. The system as claimed in claim 22, wherein the satellite receiver is configured to generate a continuous data stream of data packets from the received receive signal, and wherein the device is configured to generate a continuous data stream of data packets and fill-in packets from the received data packets and the one or more fill-in packets.

44. The system as claimed in claim 22, wherein the reference data sequence is at least three times as long as a data packet, so that, even if a data packet is lost, a workable correlation result is still achieved.

45. A system configured to transmit data packets that are based on a first receive signal and a second receive signal of a satellite receiver, comprise the first receive signal and the second receive signal, and are provided with packet sequence marks and channel marks, the system comprising:

a satellite receiver configured to provide data packets that are based on a satellite signal, comprising:
a sampler configured to sample the satellite signal or an intermediate frequency signal derived therefrom so as to acquire a sequence of samples for the satellite signal;
a data packet generator configured to generate a first data packet comprising a first subsequence of the samples, and to generate a second data packet comprising a second subsequence of the samples, the data packet generator being configured to provide the first data packet with a first packet sequence mark and to provide the second data packet with a second packet sequence mark, the packet sequence marks describing a temporal relationship between the first subsequence of samples and the second subsequence of samples;
a first device configured to determine a position of a satellite receiver;
a second device configured to determine the position of the satellite receiver,
a transmitter; and
a channel associator, wherein
the transmitter is connected between the satellite receiver and the channel associator, so that the channel associator is fed the output signal of the satellite receiver,
the channel associator is configured to feed the received data packets to the first device or to the second device while using a channel mark,
the first device configured to determine a position of a satellite receiver is a device configured to determine a position of a satellite receiver on the basis of data packets that are received from the satellite receiver, comprise a satellite signal, and are provided with packet sequence marks, the device comprising:
a packet loss detector configured to detect, while using the packet sequence marks, whether one or more data packets between two received data packets have been lost, and
a data packet processor configured to replace the one or more lost packets by one or more fill-in packets so as to generate a data stream as a sequence of the received data packets and of the fill-in packets inserted in place of the lost data packets,
a correlator configured to correlate the data stream with a reference data sequence so as to acquire a correlation result, and
a position determiner configured to determine the position of the satellite receiver based on the correlation result; and
the second device configured to determine a position of a satellite receiver is a device configured to determine a position of a satellite receiver on the basis of data packets that are received from the satellite receiver, comprise a satellite signal, and are provided with packet sequence marks, the device comprising:
a packet loss detector configured to detect, while using the packet sequence marks, whether one or more data packets between two received data packets have been lost, and
a data packet processor configured to replace the one or more lost packets by one or more fill-in packets so as to generate a data stream as a sequence of the received data packets and of the fill-in packets inserted in place of the lost data packets, and
a correlator configured to correlate the data stream with a reference data sequence so as to acquire a correlation result, and a position determiner configured to determine the position of the satellite receiver based on the correlation result.

46. The system as claimed in claim 45, wherein the second device is configured to be coupled to the first device so as to generate the data stream of the second device such that it is temporally synchronous with the data stream of the first device.

47. A non-transitory computer readable medium including a computer program for performing, when the computer program runs on a computer, a method of determining a position of a satellite receiver on the basis of data packets that are received from the satellite receiver, comprise a satellite signal, and are provided with packet sequence marks, the method comprising:

detecting, while using the packet sequence marks, whether one or more data packets between two received data packets have been lost;

replacing the one or more lost packets by one or more fill-in packets so as to generate a data stream as a sequence of the received data packets and of the fill-in packets inserted in place of the lost data packets;

correlating the data stream with a reference data sequence so as to acquire a correlation result; and determining the position of the satellite receiver based on the correlation result; wherein a number of lost data packets between two successively received data packets is determined by evaluating a relationship between the packet sequence marks of the two successively received data packets; and the packet sequence marks are configured as counters, and wherein the number of lost data packets is determined while using the difference of the counter readings of the two counters within two successively received data packets.

* * * * *

UNITED STATES PATENT AND TRADEMARK OFFICE
CERTIFICATE OF CORRECTION

PATENT NO. : 8,451,170 B2
APPLICATION NO. : 12/933154
DATED : May 28, 2013
INVENTOR(S) : Foerster et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 195 days.

Signed and Sealed this
Eighth Day of September, 2015

Michelle K. Lee
*Director of the United States Patent and Trademark Office*